United States Patent
Meynen et al.

(10) Patent No.: US 12,493,201 B2
(45) Date of Patent: Dec. 9, 2025

(54) ELECTRO-ACTIVE OPHTHALMIC DEVICE SATISFYING A PRESCRIPTION FOR 5 POWER CORRECTION(S), MANUFACTURING METHOD AND USE OF A SEMI-FINISHED HYBRID LENS

(71) Applicant: Essilor International, Charenton-le-Pont (FR)

(72) Inventors: Mathieu Meynen, Charenton le Pont (FR); Sira Uhalte Nogues, Charenton-le-Pont (FR); Antoine Monvoisin, Charenton le Pont (FR); Chafik Habassi, Ormesson-sur-Marne (FR)

(73) Assignee: Essilor International, Charenton-le-Pont (FR)

( * ) Notice: Subject to any disclaimer, the term of this patent is extended or adjusted under 35 U.S.C. 154(b) by 421 days.

(21) Appl. No.: 18/063,770

(22) Filed: Dec. 9, 2022

(65) Prior Publication Data
US 2023/0185112 A1 Jun. 15, 2023

(30) Foreign Application Priority Data
Dec. 10, 2021 (EP) ..................................... 21306745

(51) Int. Cl.
*G02C 7/08* (2006.01)
*B29D 11/00* (2006.01)
(Continued)

(52) U.S. Cl.
CPC ........ *G02C 7/083* (2013.01); *B29D 11/00413* (2013.01); *B29D 11/00528* (2013.01);
(Continued)

(58) Field of Classification Search
None
See application file for complete search history.

(56) References Cited

U.S. PATENT DOCUMENTS

| | | | |
|---|---|---|---|
| 5,232,637 A | 8/1993 | Dasher et al. | |
| 5,343,260 A | 8/1994 | Henry et al. | |

(Continued)

FOREIGN PATENT DOCUMENTS

| | | | |
|---|---|---|---|
| CN | 107924098 A | 4/2018 | |
| CN | 109031694 A | 12/2018 | |

(Continued)

OTHER PUBLICATIONS

European Search Report Issued Jun. 3, 2022 in European Application 21306745.7 Filed on Dec. 10, 2021, 8 pages.
(Continued)

*Primary Examiner* — Darryl J Collins
(74) *Attorney, Agent, or Firm* — Oblon, McClelland, Maier & Neustadt, L.L.P.

(57) ABSTRACT

An ophthalmic device satisfying a prescription for at least one power correction for a wearer, a method for manufacturing the ophthalmic device, and a method for applying a semi-finished hybrid ophthalmic lens. The ophthalmic device includes at least one electro-active cell which includes a rear shell and a front shell defining a backside surface and an opposite front surface, the shells being provided with transparent electrodes and delimiting a sealed cavity. The rear shell derives from a semi-finished hybrid ophthalmic lens including a front mineral part having a first mineral face proximal to the front shell and a second mineral face opposite to the first mineral face, and a rear plastic part attached to the front mineral part.

17 Claims, 4 Drawing Sheets

(51) Int. Cl.
*G02B 1/04* (2006.01)
*G02C 7/02* (2006.01)
(52) U.S. Cl.
CPC ........ *B29D 11/00817* (2013.01); *G02B 1/041* (2013.01); *G02C 7/027* (2013.01)

(56) References Cited

U.S. PATENT DOCUMENTS

| | | | | |
|---|---|---|---|---|
| 7,290,875 | B2* | 11/2007 | Blum | G02F 1/1345 349/13 |
| 12,055,796 | B2* | 8/2024 | Muramatsu | B29D 11/00807 |
| 2012/0229754 | A1* | 9/2012 | Iyer | G02C 7/083 351/159.4 |
| 2013/0107186 | A1* | 5/2013 | Ando | B29D 11/00817 349/153 |
| 2018/0196283 | A1 | 7/2018 | Ballet et al. | |
| 2018/0210233 | A1* | 7/2018 | Cano | G02C 7/101 |
| 2020/0050019 | A1 | 2/2020 | Jiang et al. | |
| 2022/0252904 | A1* | 8/2022 | Hones, Jr. | A61B 3/04 |

FOREIGN PATENT DOCUMENTS

| | | |
|---|---|---|
| CN | 110520786 A | 11/2019 |
| EP | 0 552 498 A1 | 7/1993 |
| EP | 3 396 439 A1 | 10/2018 |
| WO | WO 2017/009563 A1 | 1/2017 |

OTHER PUBLICATIONS

Combined Chinese Office Action and Search Report issued Apr. 24, 2025 in Chinese Patent Application No. 202211596477.1 (with English Translation), 28 pages.

* cited by examiner

ELECTRO-ACTIVE OPHTHALMIC DEVICE SATISFYING A PRESCRIPTION FOR 5 POWER CORRECTION(S), MANUFACTURING METHOD AND USE OF A SEMI-FINISHED HYBRID LENS

FIELD OF THE INVENTION

The present invention relates to an ophthalmic device intended for a wearer and satisfying a prescription for at least one power correction for the wearer, comprising at least one electro-active cell, to a method for manufacturing the ophthalmic device and to a use of a semi-finished hybrid ophthalmic lens comprising a front mineral part and a rear plastic part attached thereto in a rear shell of an electro-active ophthalmic device. The invention applies to electro-active cells such as electrochromic or variable-power cells, without any limitation, for example for augmented reality eyeglasses, virtual reality eyeglasses and electro-focus tunable lenses, including devices imparting a monofocal or multifocal correction (e.g. progressive eyeglasses) and optionally an astigmatism correction for the wearer.

DESCRIPTION OF RELATED ART

In a known manner, an electrochromic (EC) cell typically has a structure comprising two transparent outer shells both made of a mineral material or both made of an organic material, on which shells transparent electrically conductive coatings are deposited on inner faces thereof so as to form electrodes. An EC liquid or gel composition usually fills a cavity formed between the facing electrically conductive coatings, the EC composition comprising at least one oxidizing compound and at least one reducing compound that will respectively be reduced and oxidized when an electric field is applied between the electrodes of the cell. Alternatively, only one electrically conductive coating may be provided on a same shell inner face, in which case this conductive coating is divided into two electrodes by structuration on this same shell, for instance with a comb-like structure or an interdigitated structure. At least one of these oxidizing and reducing compounds is an EC compound. It is thus possible to vary the light transmission value of the cell by applying this electric field. The support of the two transparent shells and the sealing of the cavity is usually achieved by means of a peripheral seal.

The EC compound has EC properties, i.e. that changes color between its reduced and oxidized state. It can be a mixture of different EC compounds. When an EC compound is reduced or oxidized, there needs to be another redox active compound that can give or accept the electrons that the EC compound respectively accepts or gives. This other redox active compound can itself be an EC compound. With such EC cells, it is possible to control the redox state and hence the color of the EC compounds in the cell by applying an electric field between the electrodes. Combining several EC compounds in an EC cell can be useful to adjust the color of the cell when no electric field is applied between the electrodes (passive state) and when an electric field is applied (active state).

It is known to glue a finished (i.e. surfaced) prescription lens to the rear surface of an assembled EC cell (both shells thereof having been surfaced, edged, filled and sealed) or, alternatively, to provide an EC cell with a clip add-on prescription lens. As an EC cell usually has a thickness of between 1.8 mm and 2.3 mm, the added prescription lens must be as thin as possible.

As of today, only polycarbonate is known to allow to manufacture thin parts for such glued prescription lenses, and the front face of the finished prescription lens to be glued to the rear surface of the EC cell must exhibit a stable surface over time (i.e. which does not undergo a warpage after several days), and plastic materials other than polycarbonates knowingly do not allow, once glued, to achieve a determined final power of the prescription-added EC cell.

Another drawback of gluing a finished prescription lens to an assembled EC cell resides in its complex implementation, particularly due to a critical relative positioning step between both contours of the EC cell and the added prescription, which contours must precisely match one another. Further, some glue may overflow over the edge of the prescription-added EC cell assembly, with thus some bubbles and/or dust possibly remaining in/on the glue, among other drawbacks. For these reasons, if such defects resulting from the gluing process appear at a later stage, then the full EC assembly consisting of the EC cell and of the added prescription lens will have to be discarded, which proves very costly.

Regarding the other alternative of providing a clip add-on prescription lens to an assembled EC cell, although very thin prescription lens may be manufactured in this way, a major drawback of that alternative this solution resides in other technical and normative problems for the obtained assembly.

EP 3 413 121 A1 relates to a semi-finished lens which comprises a blank formed in a first material having a first hardness, the blank having an outline, a first face and a second face configured to be surfaced so as to constitute a first optical face of the ophthalmic lens, and a top layer formed in a second material having a second hardness greater than the first hardness, the top layer having an outline, a first face and a second face, the second face of the top layer being arranged on the first face of the blank. The outline of the top layer is equal to or included in the outline of the blank, and satisfies to a predetermined dimensional selection criterion involving the final outline of the ophthalmic lens.

More specifically, the lens of EP 3 413 121 A1 may have a finished front electrochromic layer based on glass and forming said top layer, to which is glued a rear semi-finished plastic layer forming said blank with interposition of a functional film adhered to the top layer and the blank, which blank is surfaced to provide a prescription to the lens.

A major drawback of the lens of EP 3 413 121 A1 resides in the complex gluing process, due to the functional film glued to both the mineral top layer and the plastic blank.

SUMMARY OF THE INVENTION

An object of the invention is to provide a new ophthalmic device intended for a wearer and satisfying a prescription for at least one power correction and optionally astigmatism for the wearer, comprising at least one electro-active cell which comprises a rear shell and a front shell respectively defining for the ophthalmic device a backside surface proximal to at least one eye of the wearer and an opposite front surface, the rear shell and the front shell being provided with at least one pair of transparent electrodes and delimiting a sealed cavity, which allows to overcome at least the above-mentioned drawbacks.

For that purpose, an ophthalmic device according to the invention is such that the rear shell derives from a semi-finished hybrid ophthalmic lens comprising:

a front mineral part having a first mineral face proximal to the front shell and a second mineral face opposite to the first mineral face, and a rear plastic part attached to the front mineral part, the rear plastic part having a front plastic face bonded to said second mineral face and an unsurfaced rear plastic face which defines said backside surface and is configured to impart said prescription to the ophthalmic device, after surfacing said semi-finished hybrid ophthalmic lens.

By electro-active cell, it is meant in the present description a cell which is configured to exhibit a passive state when no electric field is applied between the electrodes, and at least one active state when an electric field is applied therebetween. As explained below, the at least one electro-active cell of the invention may for example be selected from EC cells, variable-power cells and other tunable cells.

It is to be noted that the ophthalmic device according to the invention allows to add a prescription to the electro-active cell(s) with a very low thickness (substantially decreased compared to most commercially available prescription-added electro-active lenses), irrespective of the polymer used for the transparent substrate of the prescription lens, which is contrary to the above commented prior art relating to a prescription lens glued to the rear shell of an EC cell where this polymer is limited to a polycarbonate.

Indeed, the rear plastic part of the device of the invention may be based on virtually any organic polymer suitable for optical purposes as detailed below, mainly because the rear plastic part is attached in an unsurfaced state to the front mineral part and is therefore advantageously stable over time (e.g. does not undergo any warpage after bonding). In other terms, the device of the invention allows to avoid a deformation of the first mineral face of the front mineral part during the manufacturing process of the rear shell and of the resulting lens.

The device of the invention thus benefits from having an optical power that has the correct prescribed value after surfacing the semi-finished hybrid lens, since the curvature of the front plastic face is kept constant thanks to the front mineral part to which it is attached.

Since the curvature of the front plastic face is kept constant, it is also to be noted that the final addition of the front shell to the rear shell keeps the thickness of the sealed cavity also constant (i.e. with the same curvature for both the rear surface of the front shell and the first mineral face of the rear shell), and therefore the tint of the ophthalmic device will be advantageously uniform.

It is further to be noted that the ophthalmic device according to the invention significantly differs from the lens disclosed in EP 3 413 121 A1 above commented, inasmuch as the device of the invention does not comprise any functional film adhesively interposed between the rear plastic part and the remaining of the device, as defined above.

According to another feature of the invention, said front mineral part may comprise a mineral glass substrate, and said rear plastic part may form an ophthalmic lens blank comprising a plastic transparent substrate which defines said front plastic face and which may be based on at least one organic polymer selected from thermoplastic, thermosetting and photo-cured polymers.

Advantageously, said rear plastic part may comprise said plastic transparent substrate, which is a monolayer or multilayer, according to a weight fraction which may be greater than 50% and preferably greater than 70%.

According to a first embodiment, said plastic transparent substrate may be based on at least one transparent thermoplastic polymer for example selected from:
- (meth)acrylic (co)polymers, in particular polymethyl methacrylate (PMMA),
- triacetate of cellulose (TAC),
- polyesters, such as polyethylene furanoate (PEF), polyethylene terephthalate (PET) or polyethylene naphthalate (PEN),
- copolyesters,
- polycarbonate (PC),
- cyclic olefin copolymers (COC),
- cyclic olefin polymers (COP), and
- multilayer films of at least one of these polymers, and/or of at least one of a copolymer of ethylene and vinyl alcohol (EVOH), a poly(vinyl alcohol) (PVA), a polychlorotrifluoroethylene (PCTFE), a polyvinylidene chloride (PVDC) or a polyamide (PA).

According to a second embodiment, said plastic transparent substrate may be based on at least one transparent thermosetting or photo-cured polymer for example selected from polyurethanes, polyurethane/polyureas, polythiourethanes, polyol(allyl carbonate) (co)polymers, polyepisulfides, polyepoxides, and by way of thermosetting polymer, may for example be used:
- a homopolymer or copolymer of an allyl carbonate of a linear or branched aliphatic or aromatic polyol, even more preferably an homopolymer of diethylene glycol bis(allyl carbonate) such as of Orma® name, or
- a polythiourethane copolymer, such as so-called "MR8", "MR"7 and "1.74" lenses.

According to a general embodiment of the invention which may encompass any of the preceding features, the rear plastic part may have said front plastic face which is unsurfaced.

This unsurfaced front plastic face of the rear plastic part significantly distinguishes over the conventional gluing process of a finished (i.e. surfaced) prescription lens made of polycarbonate added to an EC cell, as discussed above.

Alternatively, it may be noted that said rear plastic part attached to said front mineral part may have said front plastic face which is surfaced.

According to other general embodiments of the invention which may encompass any of the preceding features, in the rear shell (which has a hybrid mineral-organic structure), said rear plastic part may be
1) chemically bonded to said mineral front part without adhesive means therebetween, being preferably:
(i) injection molded directly over said front mineral part, said plastic transparent substrate being a thermoplastic polymer which is for example selected from (meth)acrylic (co)polymers, triacetate of cellulose (TAC), polyesters, copolyesters, polycarbonate (PC), cyclic olefin copolymers (COC), cyclic olefin polymers (COP), and multilayer films of at least one of these polymers, and/or of at least one of a copolymer of ethylene and vinyl alcohol (EVOH), a poly(vinyl alcohol) (PVA), a polychlorotrifluoroethylene (PCTFE), a polyvinylidene chloride (PVDC) and a polyamide (PA), or
(ii) cast directly over said front mineral part, said plastic transparent substrate being a thermosetting or photo-cured polymer for example selected from polyurethanes, polyurethane/polyureas, polythiourethanes, polyol(allyl carbonate) (co)polymers, polyepisulfides and polyepoxides;

or 2) attached to said front mineral part with adhesive means, by gluing under gravity or under pressure, with preferably said plastic transparent substrate which is based on a thermoplastic polymer and said adhesive means which is selected from liquid glues, pressure sensitive adhesives and photocurable adhesives for example comprising, in case the thermoplastic polymer is a polycarbonate:
  a) at least one urethane acrylate oligomer in an amount ranging from about 50 to about 75 wt. %;
  b) at least one alkyl acrylate or diacrylate monomer in an amount ranging from about 10 to about 25 wt. %;
  c) at least one hydroxy-functional acrylic monomer in an amount ranging from about 8 to about 25 wt. %; and
  d) at least one free-radical generating initiator in an amount ranging from about 5 to about 9.5 wt %.

According to other general embodiments of the invention which may encompass any of the preceding features, the hybrid rear shell may be coated:
  (i) on said first mineral face, with an electrically conductive layer which forms an electrode of said at least one pair of transparent electrodes and is made of at least one of:
    a transparent conductive oxide (TCO) deposited by sputtering for example selected from ATO (AlSnO), ATZO (AlSnZnO), AZO (AlZnO), FTO (FSnO), GZO (GaZnO), ITO (InSnO), ITZO (InSnZnO), IZO (InZnO) and mixtures thereof,
    a deformable electrically conductive nanostructure comprising a metal and for example selected from nanomeshes, nanowires, nanotubes and nanogrids, and
    a stack of insulator layer (I1)-metal layer (M)-insulator layer (I2), where M is for example silver, gold of copper and where I1 is equal to or different from I2,
  the insulator layer (I2) in contact with the electrochromic composition comprising a TCO such as ITO, and the other insulator layer (I1) comprising a TCO such as ITO, or being a non-conductive layer for example able to increase light transmission through the stack or able to form a barrier layer,
  said electrically conductive layer preferably comprising a high temperature ITO; and/or
  (ii) on said backside surface, with a hardcoat which is itself preferably coated with an antireflective coating.

It may be noted that the rear shell and front shell may have curved inner surfaces opposite to the backside surface of the rear shell and to the front surface of the front shell, respectively, and these curved inner surfaces may be provided with said at least one pair of transparent electrodes which face each other on the rear shell and front shell, respectively.

It may also be noted that the deposition, before assembling the rear shell to the front shell, of a high temperature ITO for the electrically conductive layer allows to increase the visual transmittance Tv in the visible region.

Accordingly, said electrically conductive layer may e.g. comprise a combination of said transparent conductive oxide(s) (TCO), and of said deformable electrically conductive nanostructure and/or said stack of insulator layer (I1)-metal layer (M)-insulator layer (I2).

According to an exemplary embodiment of the invention, the curved inner surfaces of the front shell (which is for example of mineral structure) and of the hybrid rear shell may provided with said pair of transparent electrodes which face each other on the rear shell and the front shell, respectively, and which are defined by the following combination:

The inner surface of the front shell comprises, by way of front electrode, said at least one TCO deposited by sputtering (e.g. at least one of ATO, ATZO, AZO, FTO, GZO, ITO, ITZO and IZO), and the inner surface of the rear shell comprises, by way of facing rear electrode and optionally in addition to a barrier layer, one said electrically conductive metal nanostructure selected from one or several layer(s) of nanomeshes, nanowires and nanogrids (treated when needed with a conductive coating as at least one passivation layer as explained below, including multilayers made of several superposed electrically conductive layers and alternating passivation layers, to avoid the undesirable reaction of the metal with the oxidizing compound of the EC formulation in the EC cell, it being noted that the passivation layer may be a conductive coating such as an inert metallic layer, e.g. a gold layer).

These nanomeshes and nanowires may be obtained by methods known in the art, including the deposition of a layer of a suspension of the nanostructure in a solvent and subsequent solvent removal, e.g. by drying. Nanogrids may be obtained by photolithography methods applied on metallic layers, as known in the art. These metal nanomeshes, nanowires or nanogrid layers are advantageously also capable of sustaining a high level of deformation without losing their electrical conductivity, compared to existing TCO brittle materials, like e.g. ITO thick coatings conventionally deposited by sputtering.

Advantageously, the passivation layer(s), which may be a monolayer or multilayer (in the above case of alternating conductive nanostructures and passivation layers), may be:
  deposited on the deformable electrically conductive nanostructure, the passivation layer preferably being an electrically conductive layer such as PEDOT, a gold, rhodium, platinum or palladium-based coating or a transparent conductive oxide (TCO) coating, or else may be
  directly included in said at least one electrically conductive layer, preferably being a mixture (including bilayers or multilayers of more than two layers) of the deformable electrically conductive nanostructure(s) and of one or several electrically conductive layer(s), or a mixture of the deformable electrically conductive nanostructure(s) and of one or several transparent conductive oxide(s) (TCO).

The TCO that can be used in the passivation layer(s) of the invention are generally doped metal oxides with a formula comprising oxygen atoms and at least two other elements in various proportions, such as ATO (AlSnO), ATZO (AlSnZnO), AZO (AlZnO), FTO (FSnO), GZO (GaZnO), ITO (InSnO), ITZO (InSnZnO), IZO (InZnO), or mixtures thereof.

It is to be noted that TCO-structured electrodes which are usable for the electrically conductive layer are advantageously much less brittle than a full TCO layer.

According to an exemplary embodiment of the invention which may encompass any of the foregoing ones, the rear shell may further optionally comprise a monolayer or multilayer deformable barrier coating on said backside surface. The deformable barrier coating may form a barrier to at least one of oxygen, water vapor and solvents, and is preferably:
  based on at least one polymer derived from alcohol units, such as a copolymer of ethylene and vinyl alcohol (EVOH) or a poly(vinyl alcohol) (PVA), or an adhesive layer based on at least one polymer not derived from alcohol units, such as a polyisobutylene (PIB), or an inorganic or hybrid organic/inorganic gas barrier coating for example selected from $Al_2O_3$, $Si_3N_4$, SN, TiN, $SiO_xN_y$, $SiO_xC_y$, indium tin oxide (ITO), $SiO_2$, $ZnO_2$, and $TiO_2$, where x and y are greater than 0 and lower than or equal to 4.

Such barriers may be applied by physical vapor deposition such as vacuum evaporation or sputtering, plasma-enhanced chemical vapor deposition (PECVD), atomic layer deposition (ALD), or by neutral beam assisted sputtering (NBAS).

According to a preferred embodiment of the invention which may encompass any of the foregoing ones:

the front shell comprises a mineral glass substrate and has a mineral rear surface opposite to said front surface of the front shell, said mineral rear surface of the front shell which is concave and said first mineral face of the rear shell which is convex are curved with identical curvatures including at least one of a cylindrical, toric and spherical curvature, and the rear shell and the front shell are distant from each other by a distance of 10 µm to 400 µm, for example of 20 µm to 250 µm, forming a gap defining said sealed cavity which is delimited at a periphery thereof by an adhesive seal.

According to another aspect of the invention which may encompass any of the preceding features, the ophthalmic device forms at least one electro-active lens for example selected from variable-power lenses and electrochromic lenses, and includes augmented reality eyeglasses, virtual reality eyeglasses and electro-focus tunable lenses, sport goggles (e.g. for ski, cycling, motorcycling or other sports using goggles), preferably being spectacle glasses imparting a monofocal or multifocal correction (e.g. progressive eyeglasses).

Such spectacle glasses according to the invention make it possible to modify on demand their color and transmittance. In most cases, it is preferred that the electro-active cells, such as EC cells, have a higher transmittance in the passive state and become darker in the active state.

As for the frame on which are fitted the ophthalmic device of the invention, it may advantageously include an electronic system configured to control the electro-active cells.

It is to be noted that an ophthalmic device according to the invention as defined in the appended claims may be devoid of a frame and/or of an electronic system, battery and sensors to control the lens(es), i.e. like a semi-finished device.

According to other features of the invention which may encompass any of the foregoing ones, the front shell and/or the rear shell may further each comprise at least one of a polarizing film, a photochromic layer, photochromic polarizing layer, a hardcoat, an antireflective coating, an antismudge coating, an antifog coating, a blue light cut coating and an antistatic coating, for example on said front surface and/or on said backside surface.

As explained above, the rear shell may be coated on said backside surface with a hardcoat which is itself preferably coated with an antireflective coating.

According to another general feature of the invention which may encompass any of the foregoing ones, the sealed cavity between the front shell and the rear shell is for example filled with an electrochromic (EC) composition in case the electro-active ophthalmic device is an EC device.

The EC composition may be a liquid solution or a gel comprising:

at least one EC oxidizing agent, for example selected from mono viologens or bis viologens, anthraquinones, benzazoles, imidazo[1,2-a]pyridines, 2,1,3-benzothiadiazoles, imidazoles, benzoselenadiazoles, benzoselenazoles and derivatives thereof, and at least one EC reducing compound, for example chosen from derivatives of ferrocene, phenoxazine, phenazine, phenothiazine, thioanthrene, tetrathiafulvalene, and mixtures thereof, a solvent such as propylene carbonate, a thickener, such as a polyfunctional polymer containing at least two carboxyl moieties, for example chosen from carboxylic acids functional polyester, carboxylic acids functional polyether, carboxylic acids functional polyurethane, carboxylic acids functional polyacrylate, carboxylic acids functional polymethacrylate, carboxylic acids functional polyvinylacetate copolymer, combinations thereof or a reaction products or copolymers thereof (polymethyl methacrylate, polyvinyl acetate or a polyvinyl acetate derivative being particularly usable), and optionally an electrolyte, such as tetra-n-butylammonium tetrafluoroborate (TBA).

It may be noted that said at least one EC oxidizing agent may play the role of an electrolyte, so that it may not be necessary to add the optional electrolyte mentioned above.

Preferably, said sealed cavity is delimited at a periphery thereof by an adhesive seal which is a flexible glue preferably selected from an acrylate, methacrylate, cyanoacrylate, epoxide, polyurethane, polyisobutylene, silicone and a pressure sensitive adhesive.

It is to be noted that all types of EC cells comprising an EC composition are usable in the present invention, preferably being of the so-called "all-in-one-type" ECs which are defined for example in Alesanco et al. (Materials 2018, 11, 414) as EC cells where the EC formulation comprises at least one oxidizing compound and at least one reducing compound that will respectively be reduced and oxidized when an electric field is applied between the electrodes (at least one of these oxidizing and reducing compounds being an EC compound).

According to exemplary embodiments of the EC composition of the hybrid lens:

said at least one EC oxidizing agent is selected from mono viologens or bis viologens (i.e 4,4'-bipyridinium salts or bis[4,4'-bipyridinium]salts) such as alkylviologens, arylviologens, arylalkylviologens, alkylarylviologens, anthraquinones, benzazoles, imidazo[1,2-a]pyridines, 2,1,3-benzothiadiazoles, imidazoles, benzoselenadiazoles, benzoselenazoles and derivatives thereof, and said at least one EC reducing compound is chosen from derivatives of ferrocene, derivatives of phenoxazine, derivatives of phenazine, derivatives of phenothiazine, derivatives of thioanthrene, derivatives of tetrathiafulvalene, and mixtures thereof (for example 10-methylphenothiazine (MePhtz)).

Non limiting examples of such viologen compounds or viologen derivatives, more particularly examples of substituted dialkyl, diaryl 4,4'-bipyridinium salts, substituted dialkyl, diaryl bis[4,4'-bipyridinium]salts and mixtures thereof are described in documents EP2848667A1, EP2848668A1, EP2848669A1, EP2848670A1, EP3115433A1 and EP3345981A1 whose teachings are incorporated herein.

Preferred examples are mentioned herein, such as 1,1'-bis (3-(tert-butyl)phenyl)[4,4'-bipyridine]-1,1'-diium bis(tetrafluoroborate).

In one preferred embodiment, the redox chemical mixture comprises one said reducing compound (such as 10-methylphenothiazine) and at least one EC oxidizing compound, preferably at least two EC oxidizing compounds, for example two or three EC oxidizing compounds, preferably each EC oxidizing compound being independently selected from substituted dialkyl 4,4'-bipyridinium salts, substituted diaryl 4,4'-bipyridinium salts, substituted dialkyl bis[4,4'-bipyridinium]salts or substituted diaryl bis[4,4'-bipyridinium]salts, more preferably the at least two electrochromic oxidizing compounds being at least a substituted diaryl 4,4'-bipyridinium and at least a substituted diaryl bis[4,4'-bipyridinium].

By way of EC composition, mention may be made of a solution comprising a solvent such as propylene carbonate, a thickener as defined above (i.e. such as said polyfunctional polymer containing at least two carboxyl moieties), at least one oxidizing agent and reducing agent as defined above, and an electrolyte such as tetra-n-butylammonium tetrafluoroborate (TBA).

In a known manner, at least part of the EC compounds in the EC cell is contained in a liquid or gel which forms the EC composition and which fills the space between the electrodes to ensure the ionic conduction between them, through the electrolyte (which consists in charged species that can comprise the EC material itself and/or other redox active species and/or other ions devoid of EC properties and of redox activity). The EC composition thus gives at least part of its EC properties to the EC cell.

The EC compounds may be chosen to be colorless or weakly colored in the passive state. It is also possible that the combination of EC compounds in the EC cell gives a neutral color to the EC cell, such as grey or brown, in particular in the active state of the EC cell.

A method according to the invention for manufacturing an ophthalmic device as defined in any of the foregoing features, essentially comprises the following steps:
- a) manufacturing said semi-finished hybrid ophthalmic lens by attaching said rear plastic part having said unsurfaced rear plastic face to said front mineral part;
- b) surfacing said semi-finished hybrid ophthalmic lens, to impart said prescription to said unsurfaced rear plastic face for obtaining said backside surface; and
- c) assembling said at least one electro-active cell by joining together the front shell and the rear shell comprising the semi-finished hybrid ophthalmic lens once surfaced.

As explained above, it is to be noted that implementing this surfacing step b) after attaching the rear unsurfaced plastic part to the front mineral part allows to obtain said rear shell of the ophthalmic device without impairing the stability over time of the first plastic face of the rear plastic part, even though this rear plastic part is glued and to the front mineral part while not being based on a polycarbonate, contrary to the conventional gluing of finished polycarbonate-based prescription lenses after assembly to other parts of a device.

According to other preferred features of this method of the invention, attaching said rear plastic part to said front mineral part in step a) is implemented by one of the following:
- (i) injection molding directly over said front mineral part, a thermoplastic transparent substrate of said rear plastic part (which may be as defined above for the thermoplastic polymers and may be devoid of a polycarbonate),
- (ii) casting directly over said front mineral part, a transparent thermosetting or photo-cured substrate of said rear plastic part (which may be as defined above for the thermosetting or photo-cured polymers usable in the rear plastic part), and
- (iii) attaching a thermoplastic transparent substrate of said rear plastic part (which may be as defined above for said thermoplastic polymers may be devoid of a polycarbonate) to said front mineral part with adhesive means selected from liquid glues, pressure sensitive adhesives and photocurable adhesives, for example by gluing under gravity or under pressure by a photocurable adhesive by:
  - a0) applying the photocurable adhesive to respective faces of said thermoplastic transparent substrate and of said front mineral part;
  - a1) gluing the respective faces of the thermoplastic transparent substrate and of the front mineral part, which is horizontally surmounted by the thermoplastic transparent substrate, by gravity or under pressure; and
  - a2) applying at least one radiation through the thermoplastic transparent substrate for a period of time to set the photocurable adhesive.

It is to be noted that said rear plastic part may thus be chemically bonded to said mineral front part without adhesive means therebetween according to options (i) and (ii) of the attachment method above, or bonded to said front mineral part with adhesive means according to option (iii) of this attachment method.

According to other preferred features of the method of the invention encompassing any of the foregoing ones, this method further comprises the following successive steps between steps b) and c):
- b1) depositing a hardcoat, for example by spin spraying or inkjet coating, and optionally an antireflective coating onto said backside surface, to obtain a surfaced and coated hybrid ophthalmic lens forming the rear shell; and
- b2) edging the surfaced and coated hybrid ophthalmic lens according to a determined shape of a frame configured to receive the ophthalmic device, for example by:
  - detecting positions of an optical center and of a horizontal axis of the surfaced and coated hybrid ophthalmic lens by a blocking and centering device, so that the optical center and the axis are well positioned according to said shape of the frame, or
  - directly engraving, onto a reference element of the surfaced and coated hybrid ophthalmic lens, reference marks located outside of said shape of the frame providing the optical center and the horizontal axis.

According to other preferred features of the method of the invention encompassing any of the foregoing ones, said sealed cavity may be filled with an EC composition, said at least one electro-active cell then being an EC cell, and
the method further comprises filling with the EC composition the cavity between the front shell and the rear shell, while protecting the rear shell from the EC composition by using
a liquid solution for the electrochromic composition, the filling being implemented by
a microinjection of the liquid solution, a one-drop filling technique of the liquid solution on the front shell and a dispensing glue for sealing the rear shell before assembling step c), or in case step a) is implemented by alternative (iii), by dipping the assembly obtained in step c) in the liquid solution while using a sacrificial coating isolating in step a) the rear plastic part from the photocurable adhesive, and by removing the sacrificial coating after dipping; or a gel for said electrochromic composition, the filling being implemented by applying the gel on the rear shell before assembling step c).

According to other preferred features of the method of the invention encompassing any of the foregoing ones, this method further comprises depositing an electrically conductive layer on said first mineral face, to form an electrode of said at least one pair of transparent electrodes, said electrically conductive layer being applied:

before assembling step c), for any deposition temperature including a high temperature of the electrically conductive layer, which is for example a high temperature ITO deposited during step a); or after assembling step c), only for a low deposition temperature of the electrically conductive layer, which is for example a low temperature ITO.

It may be noted again that the deposition, before assembling step c), of a high temperature ITO for the electrically conductive layer allows to increase the visual transmittance Tv in the visible region.

It may also be noted that only a low temperature ITO may be deposited for the electrically conductive layer after assembling step c), preferably after surfacing the semi-finished hybrid ophthalmic lens, because the rear plastic part would not resist the high temperatures required for a high temperature ITO.

According to another preferred feature of the method of the invention encompassing any of the foregoing ones, in the surfacing step b):

said semi-finished hybrid ophthalmic lens is blocked, for example by means of a metal alloy with a low melting point (or by means of any other known blocking technique), if the front mineral part of the rear shell is coated in step a) with an electrically conductive layer on said first mineral face, a protective film is used to protect it during surfacing and optionally during subsequent step b1) of depositing a hardcoat and edging step b2) of the surfaced and coated hybrid ophthalmic lens, the backside surface of the ophthalmic device to be obtained is calculated so that the total power of the front shell, front mineral part and rear plastic part is equal to the wearer's prescription to obtain, and the rear plastic part is accordingly surfaced with a surfacing tool, with no contact between the surfacing tool and the front mineral part.

Advantageously, the assembling step c) may comprise joining together the front shell and the rear shell by means of a gripping system and by compressed air, among other possible techniques susceptible to be implemented.

According to another aspect of the disclosure, the invention is also directed to a use of a semi-finished hybrid ophthalmic lens comprising a front mineral part and a rear plastic part attached thereto in a rear shell of an electro-active ophthalmic device selected from variable-power lenses and EC lenses, such as an augmented reality device, virtual reality eyeglasses or electro-focus tunable lenses, for imparting a prescription to the ophthalmic device by surfacing a backside surface of the semi-finished hybrid ophthalmic lens, assembling the same to a front shell, and for example obtaining a sealed cavity therebetween filled with an EC composition in case the electro-active ophthalmic device is an EC device.

This use of a semi-finished hybrid ophthalmic lens according to the invention may further encompass any of the foregoing features relating to the ophthalmic device and its manufacturing method.

BRIEF DESCRIPTION OF THE DRAWINGS

The present invention will be described in more detail by referring to the appended drawings, wherein.

DETAILED DESCRIPTION OF INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about." Also unless otherwise indicated, the indication of an interval of values (from «X to Y» or "between X to Y", according to the present invention, means as including the values of X and Y.

Exemplary Ophthalmic Devices According to the Invention:

FIGS. 1-6 and their below description relate to non-limiting examples of electro-active cells, such as EC cells, and related ophthalmic devices and related as disclosed in WO 2017/009563 A1 except for the combination of materials selected for the front shell and the rear shell, respectively, which according to the invention are as detailed below.

Figure 1:
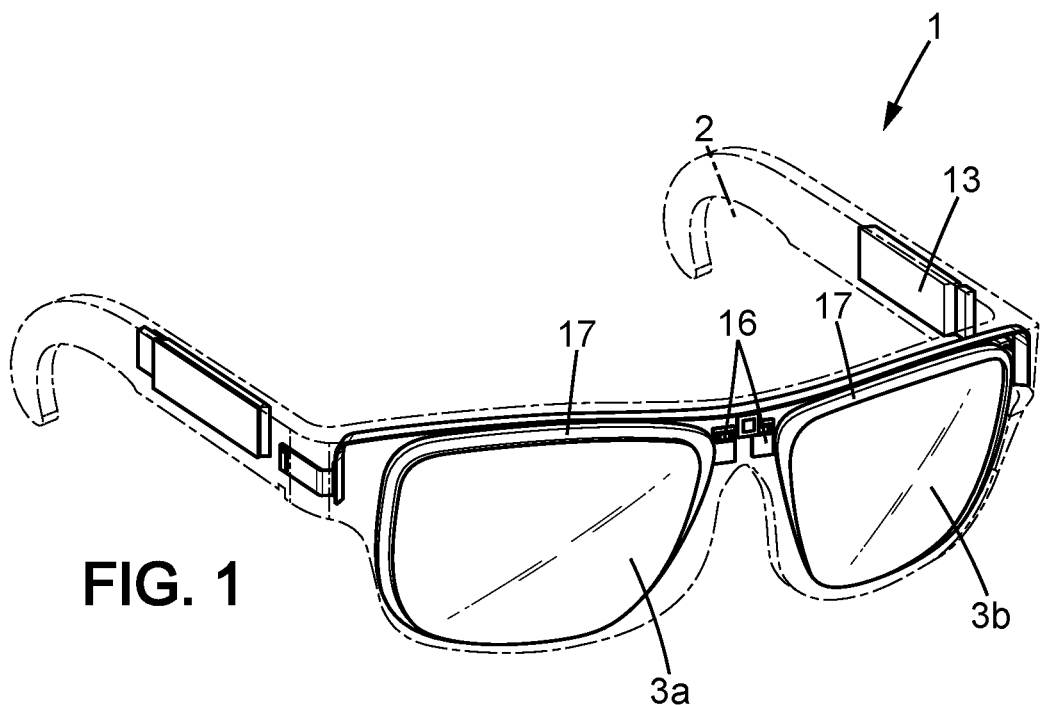
FIG. 1 is a perspective view of an ophthalmic device according to an example of the invention, comprising spectacle glasses including EC cells in both ophthalmic lenses.

According to the embodiment represented in FIG. 1, the ophthalmic device 1 comprises a frame 2 in which two EC cells 3a, 3b are mounted.

Figure 2A:
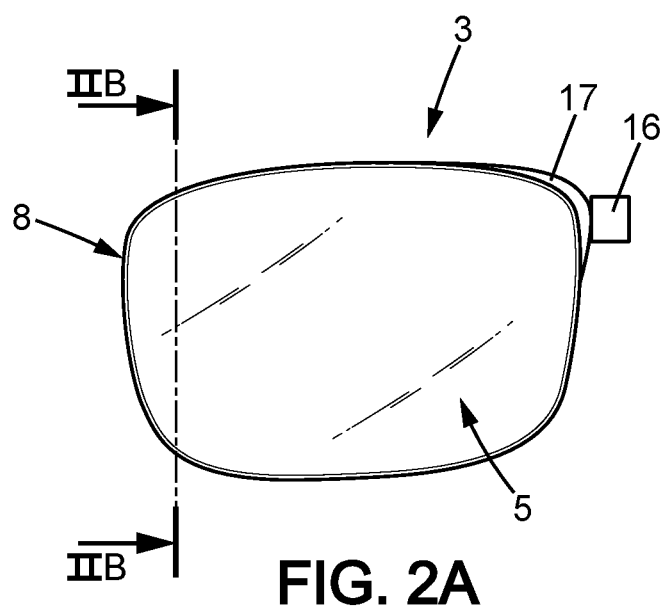
FIG. 2A is a front view of one EC ophthalmic lens of the spectacle glasses of FIG. 1.
Figure 2B:
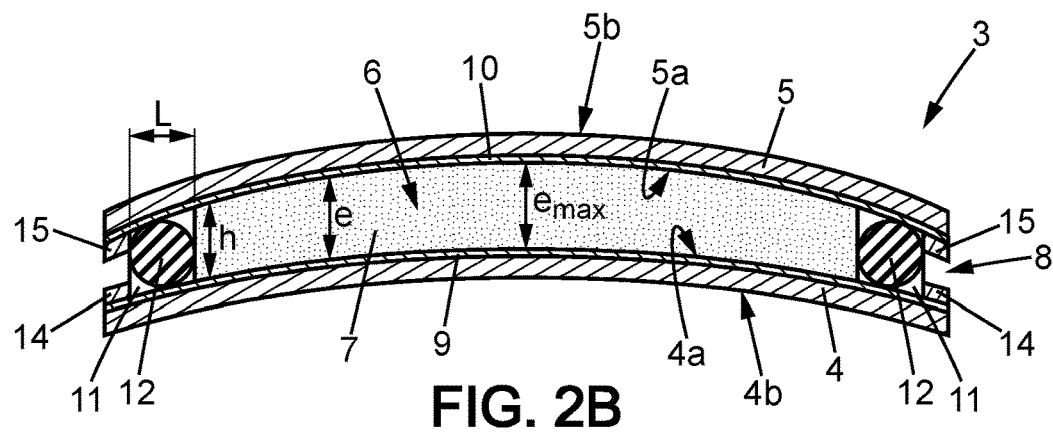
FIG. 2B is a schematic cross-sectional view in the plane IIB-IIB of FIG. 2A of this EC ophthalmic lens, which shows an EC cell forming this lens.

As represented in FIG. 2B, each EC cell 3 comprises two transparent shells 4, 5 forming outer layers that are advantageously not conductive, delimiting between them a cavity 6 intended to be filled by an electrochromic composition 7.

Thus, each transparent shell 4, 5 comprises an inner face 4a, 5a and an outer face 4b, 5b. Thus, the term "inner" more particularly denotes the faces 4a, 5a delimiting the cavity 6 of the cell 3, and the term "outer" more particularly denotes the faces 4b, 5b outside the cavity 6. The cavity 6 thus has a thickness e between the two inner faces 4a, 5a.

Specifically, a transparent shell 4 which is designed to form by its outer face 4b a backside surface proximal to one eye of a wearer for the resulting EC ophthalmic lens once worn by the wearer, defines the hybrid rear shell 4 of the invention as defined above, which thus predominantly comprises in weight said organic polymeric substrate of thermoplastic, thermosetting of photo-cured type.

Conversely, the other transparent shell 5 which is designed to form by its outer face 5b an opposite front surface for the resulting EC ophthalmic lens once worn by a wearer, is for example a mineral front shell 5, which thus predominantly comprises in weight said mineral glass substrate.

The transparent shells 4, 5 may also be chosen to filter the ultraviolet radiation, in particular to absorb wavelengths below 420 nm for example. Generally, the material of the shells 4, 5, or the treatment of the inner 4a, 5a and/or outer 4b, 5b faces thereof may enable the shells 4, 5 to have advantageous features, such as enabling colored reflections, a mirror effect, protection with respect to blue light or protection with respect to infrared radiation, without this list being limiting. These outer faces 4b, 5b may also be coated with anti-scratch coatings, antireflective (AR) coatings, anti-smudge coatings, antifog coatings, primer coatings, etc. According to one embodiment, the shells 4, 5 may be colored, photochromic and/or polarized. According to one embodiment, the front shell 5 may be made of a tempered material, so as to increase the mechanical strength thereof.

For example, each of the shells 4, 5 may have a hardcoat, an AR coating, an anti-smudge coating or an antistatic coating on its outer surface 4b, 5b. Some hardcoats or AR coatings may also be used under the electrically conductive coatings 9, 10 described below. Besides, the rear shell 4 and/or the front shell 5 may also include a polarizing film, or a photochromic layer, or even a photochromic polarizing layer.

Preferably, the shells 4, 5 have a thickness of between 50 µm and 2000 µm, or even between 300 µm and 1000 µm. The shells 4, 5 may for example be spherical shells, and have in particular a spheroid or ovoid shape delimited by a peripheral edge 8.

According to the invention, at least one inner face 4a, 5a, in particular both inner faces 4a, 5a, of the shells 4, 5 are curved, i.e. they have a non-zero curvature. For example, the inner faces 4a, 5a of the shells 4, 5 may each be concave or convex. Moreover, the outer faces 4b, 5b of the shells 4, 5 may also be curved, and in particular be concave or convex.

The inner face 4a, 5a of each of the transparent shells 4, 5 is at least partially, and preferably completely, covered by an electrically conductive coating 9, 10 as defined above, i.e. which each for example comprises:
  a transparent conductive coating of at least one TCO deposited by sputtering (e.g. at least one of ATO, ATZO, AZO, FTO, GZO, ITO, ITZO and IZO), or
  an electrically conductive nanostructure based on a metal (e.g. silver), selected from nanomeshes, nanowires and nanogrids and, when needed, being treated with at least one passivation layer to avoid reaction of the metal with an EC formulation of the EC cell,
  a stack of insulator layer (I1)-metal layer (M)-insulator layer (I2), where M is for example silver, gold of copper and where I1 is equal to or different from I2,
  the insulator layer (I2) in contact with the electrochromic composition (7) comprising a transparent conductive oxide (TCO), for example indium tin oxide (ITO), and
  the other insulator layer (I1) comprising a transparent conductive oxide (TCO), for example indium tin oxide (ITO), or being a non-conductive layer for example able to increase light transmission through the stack or able to form a barrier layer, and/or
  a polymer conductive coating.

It is to be noted that the treatment of the electrically conductive nanostructure with at least one passivation layer (including multilayers made of several superposed electrically conductive layers and alternating passivation layers) may not be needed, in case the electrically conductive nanostructure (e.g. nanowires) which is used is already passivated.

The hybrid rear shell 4 may include at least one barrier layer (which may be a monolayer or multilayer barrier coating) on its inner face 4a (i.e. designed to form said first mineral face) and/or outer face 4b (designed to form said backside surface). The barrier layer(s) of the rear shell 4 may for instance be a barrier to gases (e.g. oxygen) and/or to water vapor, and allow(s) to further protect the EC ophthalmic device 1 and to extend its lifetime.

As disclosed above in a particularly preferred embodiment of the invention, an advantageous combination for the electrically conductive coating 9, 10 of both rear and front shells 4 and 5 may be to provide:
  the hybrid rear shell 4 with the combination of the barrier layer disclosed above and of an electrically conductive coating made with metallic nanowires, nanomeshes or nanogrids combined with a conductive polymer layer as a passivation layer, and
  the mineral front shell 5 with a TCO (e.g. ITO) coating exhibiting a satisfactory electrical conductivity.

Specifically, the nanowires or nanomeshes may be applied e.g. by spray coating, bar coating, inkjet coating, spin coating or also by screen printing on flat substrates, or by spray or spin or inkjet coating on curved substrates. The metallic nanogrids may be made by photolithography, and the passivation layer may be applied by various techniques (e.g. from PEDOT or other conductive polymer layers applied by spin, spray, inkjet or bar or screen printing coating processes, from gold or rhodium coating by electrochemical or electroless processes, or from thin layers of TCO such as ITO deposited by PVD, PECVD or sputtering). Silver nanowires or nanomeshes can also be directly included in the polymer conductive coatings, as e.g. in a commercially available mixture of PEDOT and silver nanowires (e.g. from Heraeus).

The curvature radius of the shells 4, 5 are adapted so as to have a constant gap between both shells 4, 5 after assembling them. For assembling the shells 4 and 5, a process similar to one of those knowingly used for mineral glass shells may be used, provided it minimizes the constraints applied on the hybrid rear shell 4 to avoid any deformation thereof, particularly if this rear shell 4 is thin. Nonetheless, other known processes may be used.

The cell 3, and in particular the two transparent shells 4, 5, are held together by a peripheral seal 11. The seal 11 thus completely surrounds the cavity 6. The seal 11 makes it possible to ensure a sufficient thickness e of the cell 3, and also a lack of direct contact between the electrically conductive coatings 9, 10 of each of the shells 4, 5.

The seal 11 has a height h, in particular after assembling the cell 3, between a few tens of micrometers and a few hundreds of micrometers, preferably between 20 μm and 400 μm, or even more specifically between 80 μm and 300 μm, or even more specifically still between 90 and 250 μm. By way of example, the height h of the seal 11 may be equal to around 200 μm. This height h corresponds to the thickness e of the cavity 6 in the vicinity of the peripheral edges 8 of the transparent shells 4, 5, in particular of the peripheral edges of the inner faces 4a, 5a.

More specifically, the height h of the seal 11 as represented in FIG. 2B corresponds to a seal 11 which is not deposited on connecting elements 14, 15 as will be described below. However, in one embodiment in which the seal 11 is deposited, in particular partially, on connecting elements 14, 15 the height h corresponds to the height of the seal 11 and to the height of the connecting elements 14, 15 taken together.

Moreover, the width L of the seal 11 is preferably less than 5000 μm for a goggle application or less than 1000 μm for an ophthalmic lens, or even less than 3000 μm for a goggle and less than 800 μm for an ophthalmic lens. Thus, when the ophthalmic device 1 is installed in a frame 2, the seal 11 will not be visible and will not limit the visual field of the wearer or the useful area of the ophthalmic device 1.

The term "width" denotes the size of an element extending in a plane substantially parallel to the inner faces 4a, 5a of the transparent shells 4, 5. The term "height" or "thickness" denotes the size of an element extending in a direction substantially transverse to the inner faces 4a, 5a of the shells 4, 5.

The seal 11 is made from an adhesive material which maintains the cohesion between the two transparent shells 4, 5. The adhesive material may be any flexible glue able to sustain the deformation during the selected assembling process.

According to an embodiment, the adhesive material may be a flexible glue selected from an acrylate, methacrylate, cyanoacrylate, epoxide, polyurethane, polyisobutylene or silicone glue, preferably a polyisobutylene, cationic epoxy, epoxy-amine, epoxy-anhydride or oxime silicone glue. The adhesive material may alternatively be a pressure sensitive adhesive that can be applied like a hotmelt adhesive solvent-based or not.

The adhesive material is preferably a light- and/or thermally-polymerizable resin, and may in particular be a polyisobutylene pressure sensitive adhesive or a cationically initiated epoxy resin. Except for a polyisobutylene glue, such a resin (e.g. a cationic epoxy) may be crosslinked by exposure to light and/or by thermal heating as will be described subsequently. A filled epoxy resin, once crosslinked, makes it possible to obtain a seal 11 having a good mechanical strength. Moreover, the seal 11 thus obtained is watertight and airtight.

According to one embodiment, the adhesive material is compatible, or inert, with respect to the EC composition 7, namely does not induce a chemical interaction or a degradation of the EC composition 7.

According to one embodiment, the adhesive material comprises spacing elements 12, such as glass beads or polymer beads. The spacing elements 12 are electrically isolating. In particular, the spacing elements 12 of the adhesive material are in contact with each of the inner faces 4a, 5a of the shells 4, 5. The spacing elements 12 thus make it possible to define and control the height h of the seal 11 and therefore to obtain a sufficient thickness e of the cavity 6. When using a drop filling process, the spacing elements 12 may not be needed (the thickness is controlled in this case by the volume of liquid which is dispensed on one surface and by the height of the seal 11).

According to one embodiment, the adhesive material also comprises a thixotropic agent. Such a thixotropic agent makes it possible to optimize the shape of the seal 11 by controlling the amount of adhesive material deposited on one of the shells 4, 5.

The thixotropic agent makes it possible in particular to obtain a satisfactory ratio between the height h and the width L of the seal 11. It is thus possible to obtain a cavity 6 having a sufficient thickness e, while minimizing the width L of the seal 11. This makes it possible to avoid an edge effect, that is to say a local spreading of the adhesive material during the deposition thereof on the shell 4, 5, which would lead to a significant increase in the width L of the seal 11. As represented for example in FIG. 2B, the seal extends perpendicularly to the inner faces 4a, 5a, of the transparent shells 4, 5.

Furthermore, the thixotropic agent makes it possible to deposit the seal on curved surfaces while controlling the ratio between the height h and the width L of the seal. Thus, the cross-section of the seal (height h and width L) remains substantially constant, even if the seal is deposited along a complex line on a curved surface, since the control of the rheology of the seal prevents the latter from spreading or slumping and does not lead to leak-tightness or esthetic defects. Other additives can be used in the adhesive material, such as fillers, e.g. carbon black that can color the seal, etc.

The electrically conductive coatings 9, 10 of each of the shells 4, 5 form electrodes which are not in direct contact with one another and are intended to be electrically connected to an external electrical source 13, such as a battery as represented in FIG. 1.

For this purpose, a connecting element 14, 15 (also referred to as a "bus"), that is in particular metallic may be deposited at the periphery of each of the shells 4, 5 in direct contact with each conductive coating 9, 10. Each of the connecting elements 14, 15 partially, and in particular completely, surrounds each shell 4, 5 at its peripheral edge 8 and in particular at the edge face of the cell 3. Each of the connecting elements 14, 15 is in particular positioned at the peripheral edge 8 of each of the shells 4, 5, forming in particular an equipotential around each of the shells 4, 5. The connecting elements 14, 15 are for example made of copper, of gold, of silver or of nickel. Preferably, the connecting elements 14, 15 are passivated so as not to interact with the EC composition 7 and in order to prevent their corrosion.

Each of the connecting elements 14, 15 is positioned outside of the cavity 6 formed by the cell 3 and is not therefore in contact with the EC composition 7 filling the cavity 6. As a variant, the seal 11 may cover, at least partially, the connecting elements 14, 15.

The seal 11 is positioned between the cavity 6 and each of the connecting elements 14, 15. In other words, the circumference of the seal 11 is smaller than the circumference of each connecting element 14, 15. Each of the connecting elements 14, 15 is thus isolated, in particular electrically isolated, from the EC composition 7, in order to prevent any local malfunction of the cell 3.

Each connecting element 14, 15 preferably has a width of between 500 μm and 1500 μm for goggles. Each connecting element 14, 15 additionally preferably has a height of between 0.5 μm and 50 μm, preferentially between 1 and 30 μm, more preferentially still between 1 and 25 μm. The total thickness of the two connecting elements 14, 15 is inevitably less than the thickness e of the cell 3, so that these two connecting elements 14 and 15 are not in contact with one another.

In order to ensure the electrical operation of the cell 3, each connecting element 14, 15 is electrically connected to a control circuit 16. The control circuit 16 is for example a miniaturized electronic control board equipped with a microcontroller that makes it possible to control the switching on, turning off and/or transmission level of the cell 3.

Figure 4:
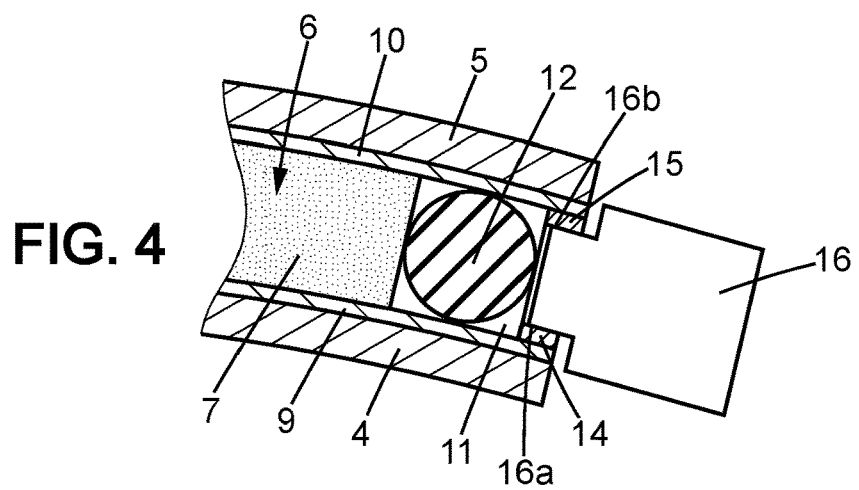
FIG. 4 is an enlarged schematic cross-sectional view of an EC ophthalmic lens according to the invention consisting of the EC cell visible in FIG. 2B, in which a control circuit is positioned directly between two connecting elements.

According to one embodiment represented for example in FIG. 4, the control circuit 16 is positioned directly between the two connecting elements 14, 15. The seal 11 is then not in contact with this control circuit 16 and does not interfere therewith. The control circuit 16 also comprises two faces 16a, 16b, each of the faces 16a, 16b being electrically connected, in particular in direct contact or with the aid of a conductive glue or a conductive adhesive, with a connecting element 14, 15. According to this embodiment, the height of the control circuit 16 between its two faces 16a, 16b is then equal to the thickness e of the cavity of the cell 3 minus the thickness of the connecting elements 14, 15.

Figure 3:
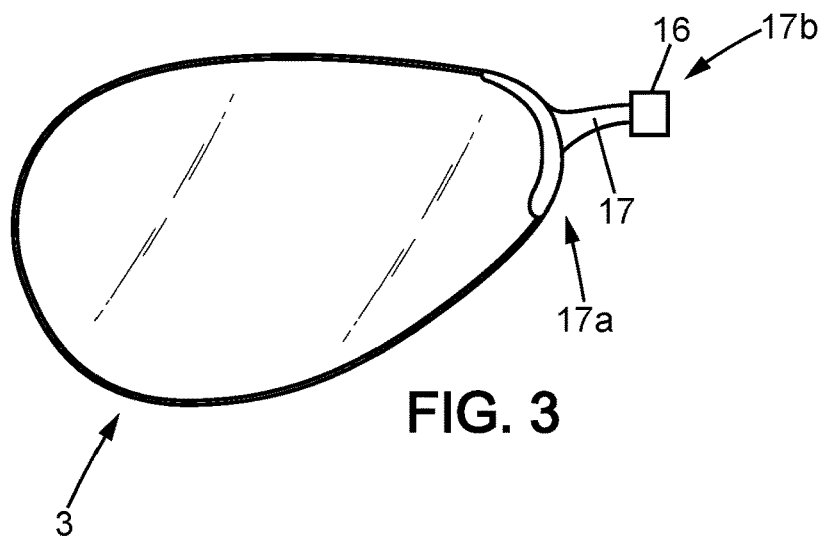
FIG. 3 is a front view of an EC ophthalmic lens according to another example of the invention connected to a control circuit by a conductive intermediate element.

According to another embodiment as represented in FIG. 3, the control circuit 16 is not positioned directly between the two connecting elements 14, 15. The ophthalmic device 1 then comprises a conductive intermediate element 17 (also referred to as "flex"). The conductive intermediate element 17 is preferably positioned on the nasal or temporal side of the frame 2 of the ophthalmic device 1 as represented in FIG. 1.

According to this embodiment, the conductive intermediate element 17 is electrically connected at a first end 17a to each of the connecting elements 14, 15 independently. The conductive intermediate element 17 may be in contact with a relatively extensive surface of each of the connecting elements 9, 10. According to this embodiment, the conductive intermediate element 17 may for example partially adopt the shape of the peripheral edge 8 of the shells 4, 5 in order to facilitate the assembling thereof with the cell 3.

The conductive intermediate element 17 may thus partially or completely surround the peripheral edge 8 of each of the shells 4, 5. According to this embodiment in which the conductive intermediate element 17 completely surrounds the peripheral edges 8 of the shells 4, 5, it is not then necessary for the cell 3 to comprise connecting elements 14, 15, the conductive intermediate element 17 acting as connecting elements 14, 15.

Thus, as a variant, the cell 3 may not comprise connecting elements 14, 15, especially when the coatings 9, 10 described above are made from a sufficiently conductive material.

The conductive intermediate element 17 is also electrically connected at a second end 17b to the control circuit 16 to enable the operation of the cell 3 to be controlled.

An electrically conductive track around each side of the lens may be needed to maintain a constant potential around the lens. This conductive track can be applied for instance by dispensing a metallic ink, like silver ink, directly on the electrically conductive layers before or after the assembling process (with which this ink should be compatible).

Methods for Manufacturing an Ophthalmic Device According to the Invention:

The following exemplary methods illustrate the present invention in a more detailed, but non-limiting manner, in the exemplary case where each electro-active cell is an EC cell 3.

Figure 5:
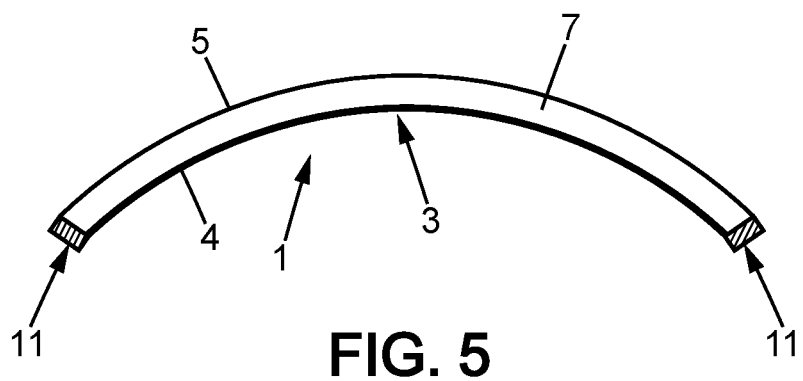
FIG. 5 is a schematic cross-sectional view similar to FIG. 2B of an EC lens according to the invention, which shows an EC cell forming the or each ophthalmic lens.
Figure 6:
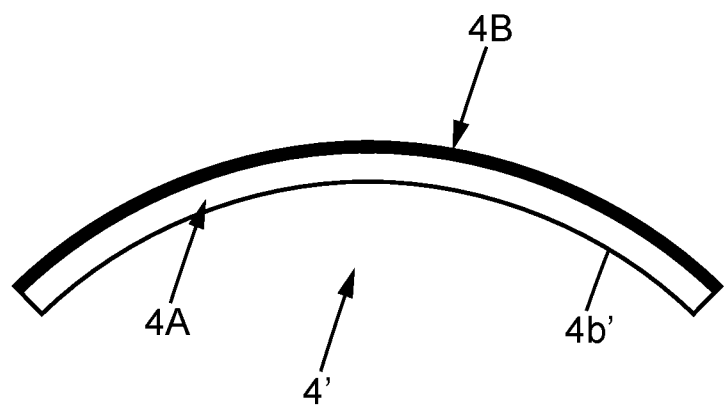
FIG. 6 is a schematic (not to scale) cross-sectional view of a semi-finished rear shell according to the invention of the EC cell visible in FIG. 5.

As visible in FIG. 5, the rear and front shells 4, 5 are assembled together with the adhesive seal 11 to form the EC cell 3 and the resulting EC ophthalmic lens, which cell 3 is filled with the EC liquid or gel composition 7.

As explained above and with reference to FIG. 6, the EC ophthalmic lens 1 is essentially manufactured by:
  a) attaching a rear plastic part 4A having an unsurfaced rear plastic face 4b' to a front mineral part 4B, to obtain a semi-finished hybrid ophthalmic lens 4';
  b) surfacing the semi-finished hybrid lens 4' obtained in a), to obtain the hybrid rear shell 4 to which a determined prescription is imparted to the rear plastic face to form the backside surface 4b of FIG. 2B; and
  c) assembling the EC cell 3 of FIG. 5 by joining together the front shell 5 and the surfaced rear shell 4 obtained in b).

Figure 7:
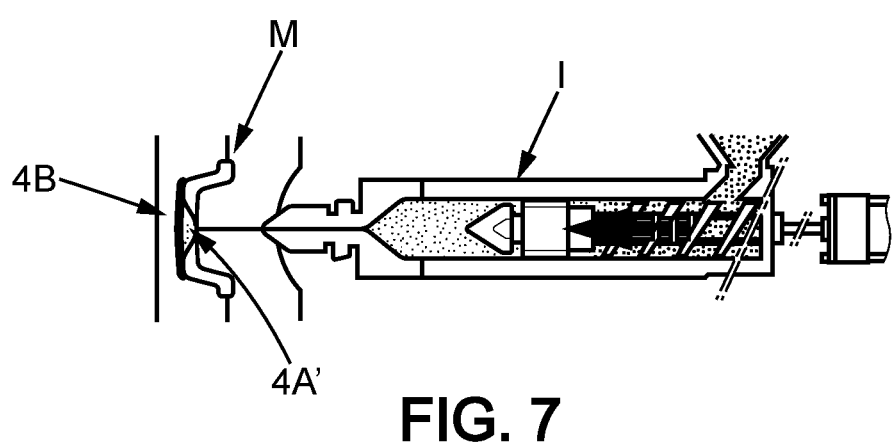
FIG. 7 is a schematic cross-sectional view of a usable injection mold in which a thermoplastic substrate of said rear plastic part is injected over said front mineral part, to provide said semi-finished hybrid ophthalmic lens of the ophthalmic device.

Step a) to Obtain the Semi-Finished Hybrid Ophthalmic Lens 4':

As visible in FIG. 7, attaching the rear plastic part 4A to the front mineral part 4B in step a) was implemented in a first embodiment by injection molding directly over the front mineral part 4B, a thermoplastic transparent substrate 4A' designed to form the rear plastic part 4A (shown in FIG. 7 while injected in an injection mold M by an injection device 1).

Figure 8:
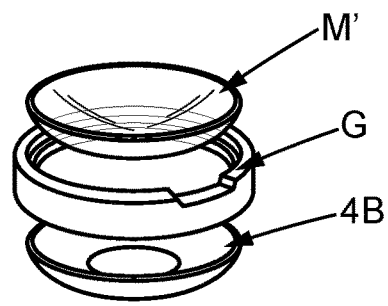
FIG. 8 is a schematic perspective view of a casting device configured for casting a thermosetting or photo-cured substrate of said rear plastic part over said front mineral part, to provide said semi-finished hybrid ophthalmic lens of the ophthalmic device.

As visible in FIG. 8, attaching the rear plastic part 4A to the front mineral part 4B in step a) was implemented in an alternative embodiment by casting directly over the front mineral part 4B a transparent thermosetting or photo-cured substrate designed to form the rear plastic part 4A. For that purpose, a backside mold M' and a casting gasket G are schematically shown above the front mineral part 4B.

Figure 9A:
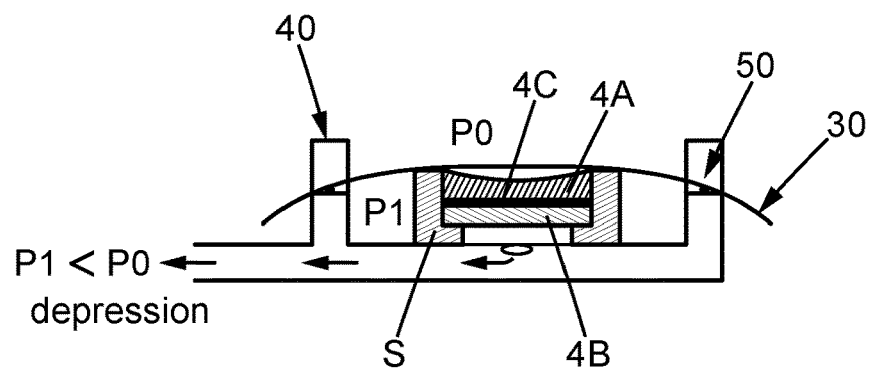
FIG. 9A is a partial schematic cross-sectional view of a device configured for gluing under negative pressure the thermoplastic substrate of said rear plastic part to said front mineral part to provide the semi-finished hybrid ophthalmic lens.
Figure 9B:
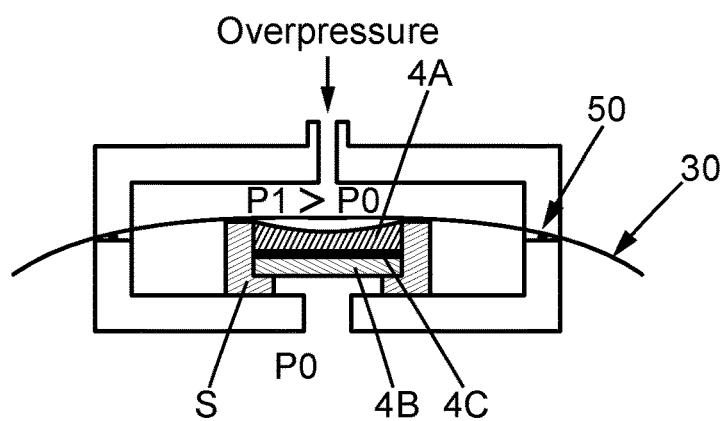
FIG. 9B is a schematic cross-sectional view of another alternative device configured for gluing under positive pressure the thermoplastic substrate of said rear plastic part to said front mineral part

As visible in both FIGS. 9A and 9B, attaching the rear plastic part 4A to the front mineral part 4B in step a) was implemented in other alternative embodiments with an adhesive 4C by gluing under pressure. The part 4B, the adhesive 4C and then the part 4A are successively stacked on an annular support S, and a flexible membrane 30 surmounts the same while being sealingly fixed by a closing ring 40 via an annular seal 50. The pressure value P0 on the outer side of a flexible membrane 30, and the pressure value P1 on the other inner side of the membrane 30 (facing both parts 4A and 4B) are visible in FIGS. 9A and 9B.

In the embodiment of FIG. 9A, an aspiration due to the fact that P1<P0 generates the adhesive bonding at 4C by gluing between the parts 4A and 4B, by depression effect.

In the embodiment of FIG. 9B, an overpressure due to the fact that P1>P0 generates the adhesive bonding at 4C by gluing by high pressure between parts 4A and 4B.

It is preferred to use the front mineral part 4B which has already been coated with an electrically conductive layer, such as a high temperature ITO, as explained above. Nonetheless, if the electrically conductive layer is deposited after assembling the rear shell 4 to the front shell 5, then this electrically conductive layer is preferably deposited after surfacing the semi-finished hybrid lens 4', so as to avoid damaging the electrically conductive layer by the protective film used for blocking the same during the surfacing step (because the adhesive may diffuse in the electrically conductive layer).

Summing up, the above presented three techniques (i.e. injection molding, casting and gluing under pressure) may be implemented by using either a nude front mineral part 4B (not coated with the electrically conductive layer), or with a front mineral part 4B which has beforehand been coated with an electrically conductive layer on its convex side.

Step b) to Obtain the Surfaced Hybrid Rear Shell with a Determined Prescription:

The semi-finished hybrid ophthalmic lens 4' obtained in a) was blocked at the beginning of step b) for example by using a metal alloy with a low melting point.

If the front mineral part 4B is already provided with an electrically conductive layer, then a surfacing protective film (commonly known as a "blue film") may be used to protect this layer during the blocking/surfacing step.

The same protecting "blue" film may also be used during the subsequent edging step to protect the electrically conductive layer.

The semi-finished lens 4' was then surfaced in order to provide the wearer with the required prescription.

For that purpose, the backside surface 4b of the semi-finished lens 4' was calculated in order to have the power of the front shell 5+front mineral part 4B+rear plastic part 4A+equal to the wearer's prescription relating to the design to be obtained for the ophthalmic device. This means that the base curve or dioptric power of the front shell 5 and rear shell 4 were known.

The rear plastic part 4A was thus surfaced with a surfacing tool, such as a diamond tool, while ensuring that there was no contact between the surfacing tool and the front mineral part 4B since the thickness of the same was known (the thickness of the front mineral part 4B was typically of more than 200 μm). It was possible to have back geometry modification to ensure no contact, for instance by increasing the central thickness if too small (in case of a negative power lens) or by increasing the edge thickness (in case of a positive power lens) if the edge of the frame shape is too thin.

Step c) to Provide the Rear Shell 4 with a Hardcoat and Optionally with an Antireflective Coating:

A hardcoat was deposited onto the backside surface 4b of the rear shell 4 surfaced in step b), for example by spin coating, spraying or inkjet coating, and optionally an anti-reflective coating was further deposited onto the deposited hardcoat, to obtain a surfaced and coated hybrid ophthalmic lens forming the rear shell 4.

Spin spraying was preferred, since no hardcoat was then deposited onto the "blue" film protecting the front mineral part 4B (in case the "blue" film is also used for the subsequent edging step, it is better to avoid having the hardcoat surmounting it), but other deposition techniques (such as dipping) may be used if the first mineral face 4a is protected.

The protective "blue" film may thus be used to protect the electrically conductive layer of the front mineral part 4B before providing the backside surface 4b with the hardcoat, after already protecting this electrically conductive layer during blocking/surfacing.

Alternatively, the electrically conductive layer may be protected via a temporary coating that can be removed after using an appropriate solvent.

Then, after depositing the hardcoat onto the backside surface 4b of the rear shell 4, an antireflective (AR) coating may further be deposited on this hardcoat using a standard vacuum deposition technique.

Step d) of Edging the Surfaced and Coated Hybrid Ophthalmic Lens:

The surfaced and coated hybrid ophthalmic lens obtained in step c) was edged according to a determined shape of a frame configured to receive the ophthalmic device (by standard edging), for example by:

detecting positions of an optical center and of a horizontal axis of the surfaced and coated hybrid ophthalmic lens by a blocking and centering device, so that the optical center (OC) and the axis are well positioned according to said shape of the frame (namely, the OC must be aligned with the position of the pupil on the frame shape, and the axis of the lens must be horizontal), or directly engraving, onto a reference element of the surfaced and coated hybrid ophthalmic lens, reference marks located outside of said shape of the frame providing the optical center and the horizontal axis.

This edging of the hybrid lens was performed on a standard edger (known as "Mr. BLUE", for instance), using a low-pressure cycle and a grinding wheel used to process mineral lenses. One way to proceed was to use a standard blocking solution (for instance Essilor's "Mr. BLUE" centering device) that detected automatically the OC position on the lens and the axis of the lens, and then stuck a blocking cup onto the lens.

As mentioned above, instead of using this OC/axis detection on the lens, it is possible to directly engrave onto said reference element of the lens (e.g. using said surfacing tool) for example two said reference marks located outside the frame shape, with a middle of the reference marks giving the optical axis and the line joining the reference marks indicating the horizontal axis.

As mentioned above, said protective "blue" film used for surfacing may also be used for edging. In this case, an edging pad is stuck onto the lens protected by this protective film, which avoids pollution of the electrically conductive coating from the edging pad glue.

Step e) of Assembling Each Electro-Active Cell:

Each electro-active cell (which was for example configured to be an EC cell) was assembled by joining together the front mineral shell 5, based on mineral glass, and the rear shell 4, by means of a standard robotic gripping system, and by using a compressed membrane to force both shells 4 and 5 one against the other one.

Step f) of Filling and then Sealing the Cavity Between the Front Shell 5 and the Rear Shell 4 with an EC Composition:

The EC composition may be filled between the front shell 5 and the rear shell 4, while protecting the rear shell 4 from the EC composition by using:

a liquid solution for the electrochromic composition, the filling being implemented by a microinjection of the liquid solution, a one-drop filling technique of the liquid solution on the front shell 5 and a dispensing glue for sealing the rear shell 4 before the assembling step e), or in case step a) was implemented by the gluing under pressure technique of FIG. 9A or 9B, by dipping the assembly obtained in step e) in the liquid solution while using a sacrificial coating isolating in step a) the rear plastic part 4A from the adhesive 4C, and by removing the sacrificial coating after dipping; or by using a gel for the EC composition, the filling being implemented by applying the gel on the rear shell 4 before assembling step e).

Each EC cell once filled was then sealed as known in the art by the peripheral seal 11, as visible in FIGS. 2B and 4.

The invention claimed is:

1. An ophthalmic device intended for a wearer and satisfying a prescription for at least one power correction and astigmatism for the wearer, the ophthalmic device comprising:

at least one electro-active cell which comprises a rear shell and a front shell respectively defining for the ophthalmic device a backside surface proximal to at least one eye of the wearer and an opposite front surface, the rear shell and the front shell being provided with at least one pair of transparent electrodes and delimiting a sealed cavity, wherein the rear shell derives from a semi-finished hybrid ophthalmic lens comprising:

a front mineral part having a first mineral face proximal to the front shell and a second mineral face opposite to the first mineral face, and a rear plastic part attached to the front mineral part, the rear plastic part having a front plastic face bonded to said second mineral face and an unsurfaced rear plastic face which defines said backside surface and is configured to impart said prescription to the ophthalmic device, after surfacing said semi-finished hybrid ophthalmic lens, and wherein said rear plastic part comprises a thermoplastic transparent substrate which defines said front plastic face, said rear plastic part being attached to said front mineral part by being chemically bonded without adhesive therebetween, and said rear plastic part being injection molded directly over said front mineral part.

2. The ophthalmic device according to claim 1, wherein said front mineral part comprises a mineral glass substrate, and wherein said rear plastic part forms an ophthalmic lens blank comprises said thermoplastic transparent substrate which is based on at least one organic polymer selected from thermoplastic polymers.

3. The ophthalmic device according to claim 2, wherein said rear plastic part has said front plastic face which is unsurfaced.

4. The ophthalmic device according to claim 1, wherein said thermoplastic transparent substrate is based on a thermoplastic polymer selected from (meth)acrylic (co) polymers, triacetate of cellulose (TAC), polyesters, copolyesters, polycarbonate (PC), cyclic olefin copolymers (COC), cyclic olefin polymers (COP), and multilayer films of at least one of these polymers, and/or of at least one of a copolymer of ethylene and vinyl alcohol (EVOH), a poly(vinyl alcohol) (PVA), a polychlorotrifluoroethylene (PCTFE), a polyvinylidene chloride (PVDC) and a polyamide (PA).

5. The ophthalmic device according to claim 1, wherein the rear shell is coated:

on said first mineral face, with an electrically conductive layer which forms an electrode of said at least one pair of transparent electrodes and is made of at least one of:

a transparent conductive oxide (TCO) deposited by sputtering selected from ATO (AlSnO), ATZO (AlSnZnO), AZO (AlZnO), FTO (FSnO), GZO (GaZnO), ITO (InSnO), ITZO (InSnZnO), IZO (InZnO) and mixtures thereof, a deformable electrically conductive nanostructure comprising a metal and selected from nanomeshes, nanowires, nanotubes and nanogrids, and a stack of a first insulator layer, a metal layer, and a second insulator layer, where the metal layer is silver, gold or copper and where the first insulator layer is equal to or different from the second insulator layer, the second insulator layer in contact with the electrochromic composition comprising a TCO, and the first insulator layer comprising a TCO, or being a non-conductive layer configured to increase light transmission through the stack or to form a barrier layer, said electrically conductive layer comprising a high temperature ITO.

6. The ophthalmic device according to claim 1, wherein the front shell comprises a mineral glass substrate and has a mineral rear surface opposite to said front surface of the front shell, wherein said mineral rear surface of the front shell which is concave and said first mineral face of the rear shell which is convex are curved with identical curvatures including at least one of a cylindrical, toric and spherical curvature, wherein the rear shell and the front shell are distant from each other by a distance of 10 μm to 400 μm, forming a gap defining said sealed cavity which is delimited at a periphery thereof by an adhesive seal.

7. The ophthalmic device according to claim 6, wherein the ophthalmic device forms at least one electro-active lens selected from variable-power lenses and electrochromic lenses, and includes augmented reality eyeglasses, virtual reality eyeglasses and electro-focus tunable lenses.

8. The ophthalmic device according to claim 1, wherein the rear shell is coated on said backside surface, with a hardcoat which is itself coated with an antireflective coating.

9. The ophthalmic device according to claim 1, wherein the front shell comprises a mineral glass substrate and has a mineral rear surface opposite to said front surface of the front shell, wherein said mineral rear surface of the front shell which is concave and said first mineral face of the rear shell which is convex are curved with identical curvatures including at least one of a cylindrical, toric and spherical curvature, wherein the rear shell and the front shell are distant from each other by a distance of 20 to 250 μm, forming a gap defining said sealed cavity which is delimited at a periphery thereof by an adhesive seal.

10. A method for manufacturing an ophthalmic device intended for a wearer and satisfying a prescription for at least one power correction and astigmatism for the wearer, the ophthalmic device comprising:

at least one electro-active cell which comprises a rear shell and a front shell respectively defining for the ophthalmic device a backside surface proximal to at least one eye of the wearer and an opposite front surface, the rear shell and the front shell being provided with at least one pair of transparent electrodes and delimiting a sealed cavity, wherein the rear shell derives from a semi-finished hybrid ophthalmic lens comprising:
- a front mineral part having a first mineral face proximal to the front shell and a second mineral face opposite to the first mineral face, and
- a rear plastic part attached to the front mineral part, the rear plastic part having a front plastic face bonded to said second mineral face and an unsurfaced rear plastic face which defines said backside surface and is configured to impart said prescription to the ophthalmic device, after surfacing said semi-finished hybrid ophthalmic lens, the method comprising:

a) manufacturing said semi-finished hybrid ophthalmic lens by attaching said rear plastic part having said unsurfaced rear plastic face to said front mineral part, wherein attaching said rear plastic part to said front mineral part is implemented by injection molding directly over said front mineral part, a thermoplastic transparent substrate of said rear plastic part;

b) surfacing said semi-finished hybrid ophthalmic lens, to impart said prescription to said unsurfaced rear plastic face for obtaining said backside surface; and c) assembling said at least one electro-active cell by joining together the front shell and the rear shell comprising the semi-finished hybrid ophthalmic lens once surfaced.

11. The method according to claim 10, wherein the thermoplastic transparent substrate of said rear plastic part is devoid of a polycarbonate.

12. The method according to claim 10, further comprising successively between steps b) and c):

b1) depositing a hardcoat, by spin spraying or inkjet coating, and an antireflective coating onto said backside surface, to obtain a surfaced and coated hybrid ophthalmic lens forming the rear shell; and b2) edging the surfaced and coated hybrid ophthalmic lens according to a determined shape of a frame configured to receive the ophthalmic device, by:
- detecting positions of an optical center and of a horizontal axis of the surfaced and coated hybrid ophthalmic lens by a blocking and centering device, so that the optical center and the axis are well positioned according to said shape of the frame, or
- directly engraving, onto a reference element of the surfaced and coated hybrid ophthalmic lens, reference marks located outside of said shape of the frame providing the optical center and the horizontal axis.

13. The method according to claim 10, wherein said sealed cavity is filled with an electrochromic composition, said at least one electro-active cell being an electrochromic cell, and wherein the method further comprises filling with the electrochromic composition the cavity between the front shell and the rear shell, while protecting the rear shell from the electrochromic composition by using:
- a liquid solution for the electrochromic composition, the filling being implemented by
  - a microinjection of the liquid solution, or
  - a one-drop filling technique of the liquid solution on the front shell and a dispensing glue for sealing the rear shell before assembling c), or
- a gel for said electrochromic composition, the filling being implemented by applying the gel on the rear shell before assembling c).

14. The method according to claim 10, wherein further comprising depositing an electrically conductive layer on said first mineral face, to form an electrode of said at least one pair of transparent electrodes, said electrically conductive layer being applied:
- before assembling c), for any deposition temperature including a high temperature of the electrically conductive layer, which is a high temperature ITO deposited during a); or
- after assembling c), only for a low deposition temperature of the electrically conductive layer, which is a low temperature ITO.

15. The method according to claim 10, wherein in the surfacing b):
- said semi-finished hybrid ophthalmic lens is blocked, by a metal alloy with a low melting point,
- if the front mineral part of the rear shell is coated in a) with an electrically conductive layer on said first mineral face, a protective film is used to protect it during surfacing and during subsequent b1) of depositing a hardcoat and edging b2) of the surfaced and coated hybrid ophthalmic lens,
- the backside surface of the ophthalmic device to be obtained is calculated so that a total power of the front shell, front mineral part and rear plastic part is equal to the wearer's prescription to obtain, and
- the rear plastic part is accordingly surfaced with a surfacing tool, with no contact between the surfacing tool and the front mineral part.

16. The method according to claim 10, wherein the assembling c) comprises joining together the front shell and the rear shell by a gripping system and by compressed air.

17. A method of applying a semi-finished hybrid ophthalmic lens comprising a front mineral part and a rear injection-molded thermoplastic part chemically bonded thereto without adhesive therebetween in a rear shell of an electro-active ophthalmic device selected from variable-power lenses and electrochromic lenses, the method comprising:
- imparting a prescription to the ophthalmic device by surfacing a backside surface of the semi-finished hybrid ophthalmic lens, and assembling the same to a front shell; and
- implementing a sealed cavity therebetween filled with an electrochromic composition in case the electro-active ophthalmic device is an electrochromic device.

* * * * *